United States Patent [19]

Blickstein

[11] 4,415,949
[45] Nov. 15, 1983

[54] AIR TRIMMER CAPACITOR

[75] Inventor: Martin J. Blickstein, Austell, Ga.

[73] Assignee: Murata Corporation of America, Rockmart, Ga.

[21] Appl. No.: 295,716

[22] Filed: Aug. 24, 1981

[51] Int. Cl.³ .............................................. H01G 5/14
[52] U.S. Cl. .................................................... 361/296
[58] Field of Search ............... 361/295, 296, 287, 291; 411/250, 251, 252, 438

[56] References Cited

U.S. PATENT DOCUMENTS

| Re. 30,406 | 9/1980 | Johanson | 361/296 |
|---|---|---|---|
| 1,589,204 | 6/1926 | Miller et al. | |
| 1,862,930 | 6/1932 | Gebhard et al. | |
| 2,001,282 | 6/1935 | Nyman | 171/41.5 |
| 2,765,431 | 10/1956 | Repro | 361/295 |
| 3,230,430 | 1/1966 | Barnes | 361/287 |
| 3,336,515 | 8/1967 | Seiden et al. | 317/249 |
| 3,382,421 | 5/1968 | Hirschberg | 317/249 |
| 3,560,811 | 2/1971 | Farago | 317/249 |
| 3,611,075 | 10/1971 | Lindsay | 361/296 |
| 4,035,697 | 7/1977 | Arnold, Jr. | 361/289 |
| 4,166,309 | 9/1979 | Schenk | 411/438 X |

FOREIGN PATENT DOCUMENTS

| 125922 | 5/1928 | Switzerland | 411/438 |
|---|---|---|---|
| 560372 | 3/1944 | United Kingdom | 361/295 |

*Primary Examiner*—Donald A. Griffin
*Attorney, Agent, or Firm*—Thomas & Kennedy

[57] ABSTRACT

A variable air trimmer capacitor has its annular interfitting electrodes movable axially with respect to each other by the helical threads of the rotor moving through the coils of a spring. Adjacent ones of the coils of the spring are axially offset from each other. The spring is confined in the barrel of a bushing which is of smaller diameter than the spring when in its relaxed state, and the coils of the spring are urged toward axial alignment when moved onto the threads of the rotor, thus assuring positive electrical contact between the rotor, spring and bushing.

7 Claims, 6 Drawing Figures

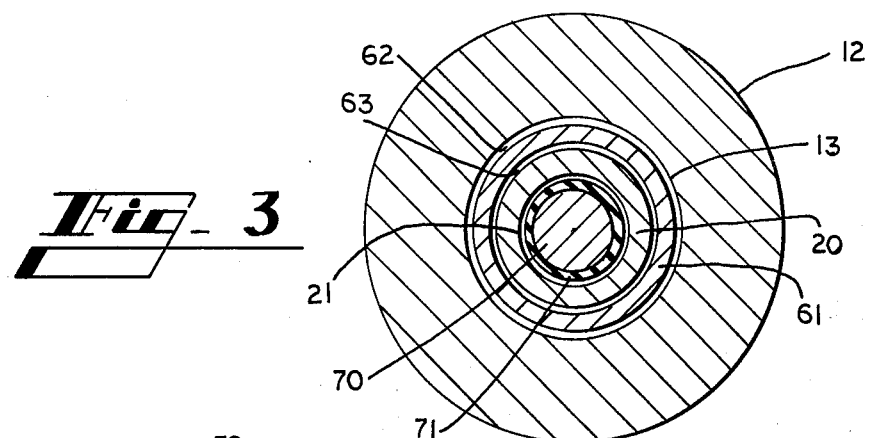
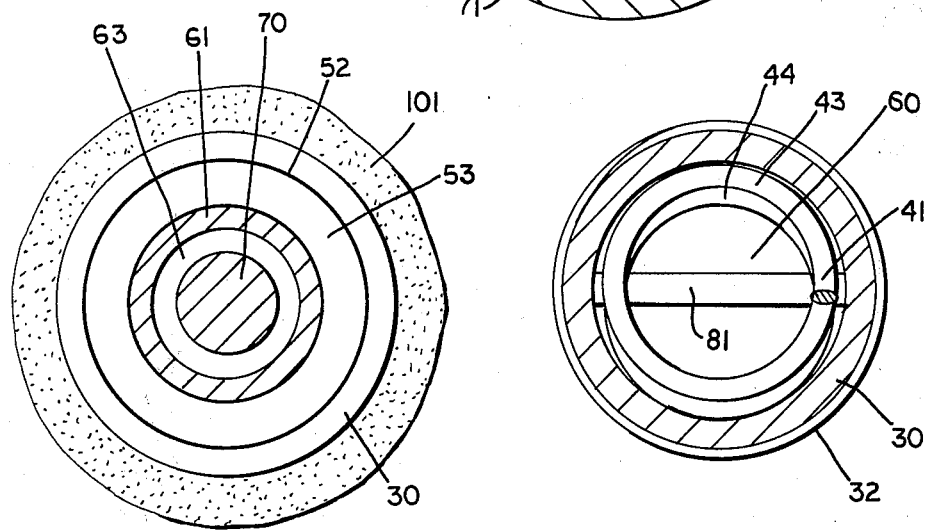
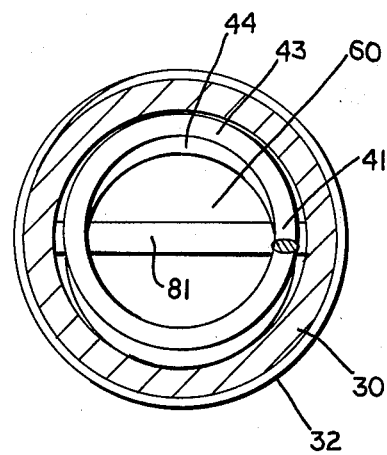
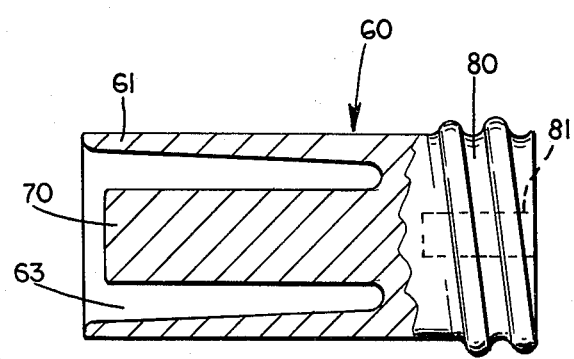

AIR TRIMMER CAPACITOR

BACKGROUND

1. Field of the Invention

This invention relates in general to variable capacitors, and specifically relates to a variable air trimmer capacitor, including a pair of concentric ring electrodes which are movable axially with respect to each other so as to provide a variable overlap of surface areas between the electrodes, thereby varying the capacitance of the capacitor.

2. Description of the Prior Art

Air dielectric trimmer capacitors are commonly used as components in ultra high frequency (UHF) circuits to provide frequency tuning capability. The circuitry involved often is used in mobile equipment which is subjected to thermal stress, vibration, and acceleration which collectively tend to cause the orientation of the capacitor plates to change, thereby altering the capacitance of the device and consequently the frequency to which the circuit is tuned.

A conventional solution to the problems encountered by shock, vibration and temperature is to construct a variable capacitor with a helical threaded engagement between a rotor which contains the movable electrode and an assembly housing which supports the stationary electrode, whereby the rotor is rotated with respect to the stator to vary the overlap of the electrodes. The movable electrode makes electrical contact with the circuit through the rotor, the threads between the rotor and the housing, and the assembly housing, which has an external connection with the circuit. Since helical threads are notoriously poor electrical contacts, it has been normal practice to distort the threads of the rotor in such a manner so as to produce an engagement mismatch in the threads between the rotor and the housing to improve conductivity for the high frequency signal. The thread distortion also helps increase the torque between the rotor and housing so as to minimize frequency drift due to vibrationally-induced migration of the rotor.

Components used in UHF applications, due to the extremely high frequencies involved, are extremely sensitive to current path geometry. Consequently, threads distorted in conventional devices provide a current path which is variable depending upon the position of the thread distortion with respect to the rotor housing external connection. When the capacitor is adjusted to provide minimum capacitance (maximum separation between electrodes), the thread distortion which provides the current path is often located a distance away from the external connection or the rotor housing. In consequence the current path changes dramatically with tuning and thereby changes self inductance, the Q factor, and the self resonant frequency. This provides an additional complication for circuit designers who must treat the variable capacitor as a variable impedance device rather than as a variable capacitor.

The distorted threads of a conventional helical thread connection between a rotor and its housing also provide problems in addition to variable current paths. While distorted thread produces a temporarily improved contact, the device wears at an abnormal rate due to increased friction between the threads. This wear, which is accelerated with repeated tuning, results in a progressively deteriorating electrical contact and a progressively looser rotor fit which is increasingly prone to vibrational migration.

Variable capacitors have a characteristic called "range," which is defined as the specified capacitance over which a capacitive device will tune. For example, a variable capacitor might have a range of 0.8 to 10 picofarads (pF). For such a device, the base or "pedestal" is 0.8 pF and the variable capacitance is 9.2 pF. Circuit designers often are required to employ an external base or "pedestal" capacitor in a circuit in conjunction with variable capacitors so as to obtain the desired basic capacitance for circuit operation together with adjustment capability. While conventional air trimmer capacitors all possess a certain amount of basic capacitance, this capacitance generally is fixed by the geometry of the device, which typically cannot be altered so as to change the basic capacitance. The circuit designer usually selects an external capacitor of appropriate capacitance and provides a parallel circuit connection between the external capacitor and the variable capacitor in order to achieve his design goals. This invariably requires additional components and consequently contributes to increased design and manufacturing costs.

SUMMARY OF THE INVENTION

Briefly described, the present invention comprises a variable air trimmer capacitor which includes coaxial concentric interleaving shells as electrodes, with one stationary electrode and at least one movable electrode, with the movable electrode adapted to be moved axially with respect to the stationary electrode so as to vary the capacitance. A suitable dielectric separates the movable electrode from the stationary electrode. A cylindrical housing or stator is provided which contains the stationary electrode at one end and receives the movable electrode at the opposite end.

The movable electrode comprises a rotor having coaxial concentric cylindrical shells at one end and having a thread defined upon the outer surface at the other end. A screwdriver slot is provided in the rotor opposite the electrode for turning the rotor. The threaded portion engages a helical coil spring which is confined in a housing attached to the stator, each turn of the spring being axially offset or eccentric from its neighboring turn. The screwdriver slot of the rotor is accessible through the coil spring and rotor housing. Rotation of the rotor moves it axially through the coil spring within the rotor housing, thereby moving the movable electrode with respect to the fixed electrode. As the threads of the rotor engage the coil spring, the eccentric turns of the spring engaged by the threads are forced toward relative concentricity because the minor diameter of the rotor threads is greater than the quiescent diameter of the coil spring. Therefore, the spring becomes tightly gripped about the threads where the spring contacts the rotor. Also, when the threads of the rotor rotate beyond some of the coils of the spring, these coils move onto the base of the electrode of the rotor which is larger in diameter than the coil spring in its relaxed condition. Thus, these threads also make positive contact with the base portion of the electrode.

The helical coil spring and rotor are confined within the coaxial rotor housing on the end of the capacitor opposite the stationary electrode. The outside diameter of the coil spring, when in its relaxed state, is slightly larger than the inside diameter of the rotor housing, so that the eccentric coils of the spring normally are biased into contact with the inside surface of the rotor housing. Consequently, there is electrical contact between the coil spring and the rotor housing along the entire length of the rotor housing. Therefore, the current path is independent of rotor position within the housing, since electrical contact is made along the entire length of the rotor housing, as opposed to a single point of contact at a threaded distortion in conventional capacitors.

The present invention contains the stationary electrode in a stator separated from the rotor housing by an annular insulating member or washer. The annular insulating member in the present invention comprises an annular alumina washer which has well-known dielectric properties. This configuration provides a minimal pedestal capacitance for the device. The washer can alternatively be made an assembly with a deliberately chosen capacitive arrangement having a higher pedestal capacitance so as to vary the range of the capacitor. Moreover, the composition of the washer can be chosen with a particular temperature coefficient to provide desirable drift characteristics. The selectability of pedestal washer capacitance and composition at the time of assembly of the variable air trimmer capacitor of the present invention provides an almost infinitely modifiable assembly having great flexibility and potential for customization.

An environmental seal between the rotor housing and the stator is provided by an annular rubber washer which is confined within an annular recess formed in the rotor housing. The annular recess in the rotor housing is fabricated with a diameter slightly smaller than the diameter of the rubber washer so that a compressive force is maintained upon the rubber washer. The interior diameter of the rubber washer circumferentially surrounds the rotor, which extends from the rotor housing through the rubber washer into the stator which contains the stationary electrode. The compression of the rubber washer by the confinement of the annular recess in the rotor housing provides simultaneously a torque against rotation of the rotor and a seal between the environmentally exposed end of the rotor having the screwdriver slot and the electrode end of the rotor.

Therefore, it is an object of the present invention to provide a coaxial variable air trimmer capacitor which provides a UHF current path independent of the position of the movable electrode.

It is a further object of the present invention to provide a coaxial variable air trimmer capacitor whose anti-rotational torque does not vary as a function of the wear of rotor housing threads.

It is a further object of the present invention to provide a coaxial variable air trimmer capacitor whose electrical contact between the movable electrodes does not deteriorate as a function of the wear of rotor housing threads.

It is a further object of the invention is to provide a variable air trimmer capacitor which is inexpensive to construct, which is durable and which is not likely to change its setting when encountering vibrations, temperature changes and other conditions of use.

It is a further object of the present invention to provide a coaxial variable air trimmer capacitor which provides superior electrical contact between the movable electrode and the electrode housing which contains the terminal connection to the electrical circuit in which the capacitor is used.

It is a further object of the present invention to provide a coaxial variable air trimmer capacitor which has selectable pedestal washer capacitance and composition which can be chosen at the time of assembly.

Other objects, features and advantages of this invention will become apparent upon reading the following specification and upon reviewing the accompanying drawings.

BRIEF DESCRIPTION OF THE DRAWINGS

FIG. 3 is a transverse cross-sectional view taken along line 3—3 of FIG. 1.

FIG. 4 is a transverse cross-sectional view taken along the line 4—4 of FIG. 1.

FIG. 5 is a transverse cross-sectional view taken along the line 5—5 of FIG. 1.

FIG. 6 is a partial longitudinal cross-sectional view of the movable electrode rotor of the present invention.

DETAILED DESCRIPTION OF THE PREFERRED EMBODIMENT

Figure 1:
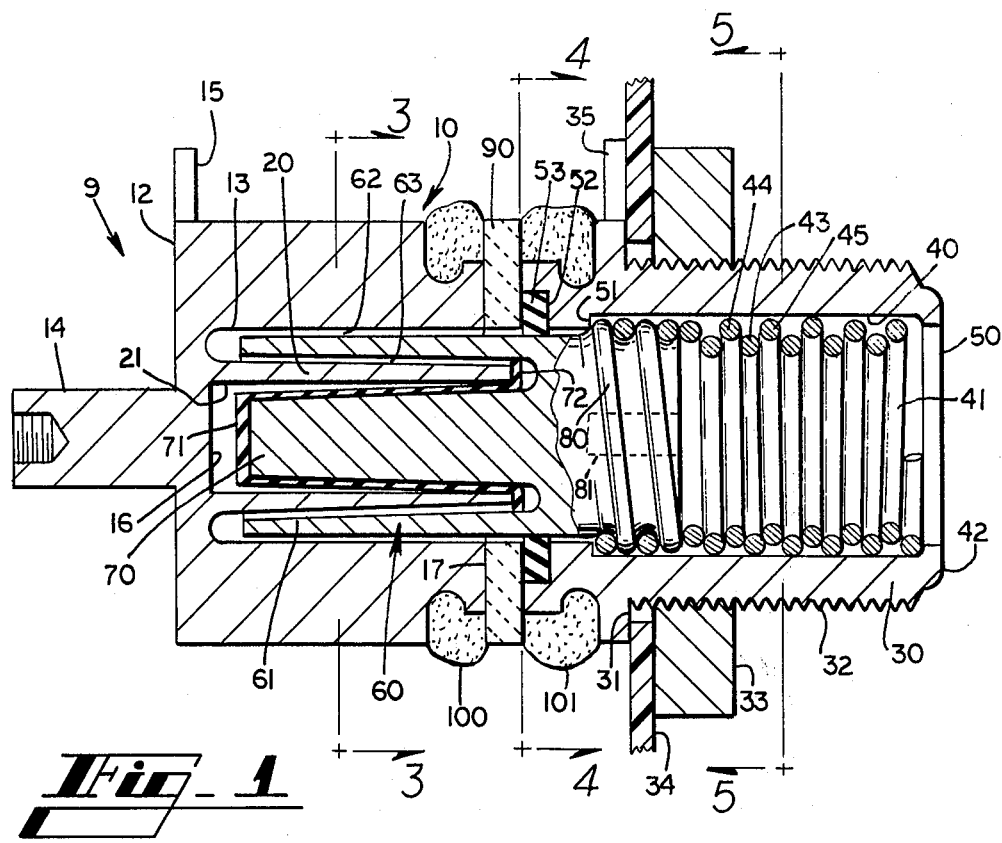
FIG. 1 is a longitudinal cross-sectional view of the variable air trimmer capacitor made in accordance with the present invention.

Referring now in more detail to the drawings, in which like numerals indicate like parts throughout the several views, FIG. 1 shows a coaxial variable air trimmer capacitor 9 constructed in accordance with the present invention and which comprises a housing 10 which is formed from a stator 12 and bushing 30. Cylindrical stator 12 has a cylindrical recess 13 having a base or end wall 16 and an open end 17. The surfaces of cylindrical recess 13 may serve either as the stationary electrode of the capacitor of the present invention or as a housing for a separate stationary electrode. In the preferred embodiment, the stator 12 is fabricated from a unitary piece of electrically conductive material suitable for comprising the electrode of a capacitor, but the stator could also be fabricated from nonconductive material so as to contain a separate capacitor electrode. The stator has a turret 14 adjacent end wall 16 and a stator lead 15, either of which can be used to connect the stator electrically to a circuit.

Within the cylindrical recess 13 of stator 12 is annular shell 20 which is concentric with cylindrical recess 13 and which extends from end wall 16 toward the open end 17 of the cylindrical recess and which has a diameter smaller than the diameter of recess 13. Annular shell 20 defines a centrally located cylindrical receptacle 21 within annular shell 20 and receptacle 21 is concentric with cylindrical recess 13. The surfaces of cylindrical recess 13, annular shell 20 and cylindrical receptacle 21 form the stationary electrode of the air trimmer capacitor of the preferred embodiment.

At the other end of housing 10 a cylindrical bushing 30 is mounted to stator 12 coaxially over the recess 13, shell 20, and receptacle 21, and is electrically isolated from the stator. The mounting of the bushing to the stator is discussed in greater detail below. The bushing 30 provides the means for attachment of the capacitor of the present invention to a circuit board, and includes an annular shoulder 31 which seats upon the circuit board 34 to which the device in FIG. 1 is attached. Along the outer surface of the bushing are threads 32 adapted to receive a threaded nut 33 so as to grasp the circuit board 34 between the shoulder 31 and the threaded nut 33. A bushing lead 35 is provided at the edge of the shoulder for electrical connection to the circuit in which the device is employed.

The bushing 30 further comprises an internal cylindrical surface or barrel 40 which has an open end 50 opposite the end of attachment to the stator 12. The barrel houses a tightly wound coil spring 41 having turns with eccentric centers. The spring is confined within the barrel by means of a swaged annular lip 42. Each turn of the spring has eccentric or offset centers so that a typical turn 43 is axially offset from the immediately adjacent neighboring turns 44, 45.

An open end 50 is provided in bushing 30 so as to provide access to the components within the barrel 40. At the end of the barrel opposite the open end 50 and swaged lip 42 is an annular shoulder 51 which acts as a stop and prevents further axial movement of components contained within the barrel, which are discussed next.

Rotatably confined within the barrel 40 of bushing 30 is a rotor 60, which has an annular shell 61 having a diameter smaller than the diameter of cylindrical recess 13 of stator 12 but a diameter larger than the diameter of annular shell 20 of the stator. Rotor shell 61 is fabricated of conductive material similar to the stator shell 20, and annular air spaces 62, 63 separate the rotor shell from the walls of recess 13 and from stator shell 20, and serve as the air dielectric of the capacitor. The rotor shell 61 functions as the movable rotor electrode.

The rotor 60 also has a cylindrical rod 70 having a diameter smaller than cylindrical receptacle 21 of the shell 20. Separating the cylindrical rod 70 of the rotor and the cylindrical receptacle 21 of the stator shell 20 is a Teflon guide sleeve 71 which extends the length of cylindrical receptacle 21. The guide sleeve has a lip 72 which protrudes beyond the diameter of stator shell 20 at the stator open end 17 so as to both guide rotor shell 61 and rod 70 along the walls of stator receptacle 21 and recess 13 and to insulate them electrically. Those having skill in the art will recognize that Teflon sleeve 71 also acts as a dielectric between the surfaces it separates and the surface of rod 70 also functions as a part of the rotor electrode.

Rotor 60, at the end opposite to its electrode shell 61, is formed with helical threads 80 adapted to receive the turns of coil spring 41. A slot 81 is defined within the end surface of rotor 60 so that a screwdriver may be inserted along the length of barrel 40 coaxially with spring 41 and engaged with the slot so as to turn the rotor. The threads 80 are molded upon the rotor with a minor diameter slightly greater than the quiescent diameter of the turns of spring 41, so that when the rotor is rotated, the threads firmly engage the coils of the spring and force them radially outwardly.

The radially outward force imparted to the turns of the coil spring 41 by the minor diameter of the rotor threads 80 forces the engaged turn of the spring toward concentricity relative to its adjacent turns, which normally would be eccentric due to the wind of the spring. It will thus be appreciated that the contact between the coils of the spring 41 and the threads 80 of the rotor 60 provides frictional resistance to the rotation of the rotor within the barrel and simultaneously provides electrical contact between the rotor and the spring. The spring, being tightly wound and confined within the barrel and biased outwardly into engagement with the inside surface of the barrel, exerts a constantly outward force against the walls of the barrel, thereby providing a current path at every point where the spring contacts the walls of the barrel. There is thus provided resistance to undesirable rotation and an improved electrical current path characteristic of the present invention.

Separating the stator 12 from the bushing 30 is an annular ceramic pedestal washer assembly 90, comprising in the preferred embodiment an annular alumina washer. It will be appreciated that the presence of alumina washer 90 provides a dielectric separation of the stator and bushing and results in a configuration having minimum shunt capacitance between stator and bushing. It will also be appreciated that this shunt capacitance may be increased if desired by changing the composition of the washer to a material having a higher dielectric constant, or by metallizing the ceramic of the washer. The stator 12, washer assembly 90, and bushing 30 are adhered by epoxy beads 100, 101.

An internal annular recess 52 is also provided on bushing 30 at the end opposite the open end 50. An annular rubber washer 53 having an outside diameter slightly larger than recess 52 and having an inside diameter slightly smaller than the diameter of rotor 60 is frictionally confined within the recess 52 adjacent the washer assembly 90. Having diameters slightly mismatched to the recess and rotor results in compression of the rubber washer when the rotor is placed through the barrel 40 into engagement with recess 13 and receptacle 21 of the stator 12. The compression of the rubber washer provides rotor anti-rotational torque additional to that provided by the threads and spring, and an environmental seal of the capacitive arrangement formed by the interposition of the rotor and stator surfaces.

Figure 2:
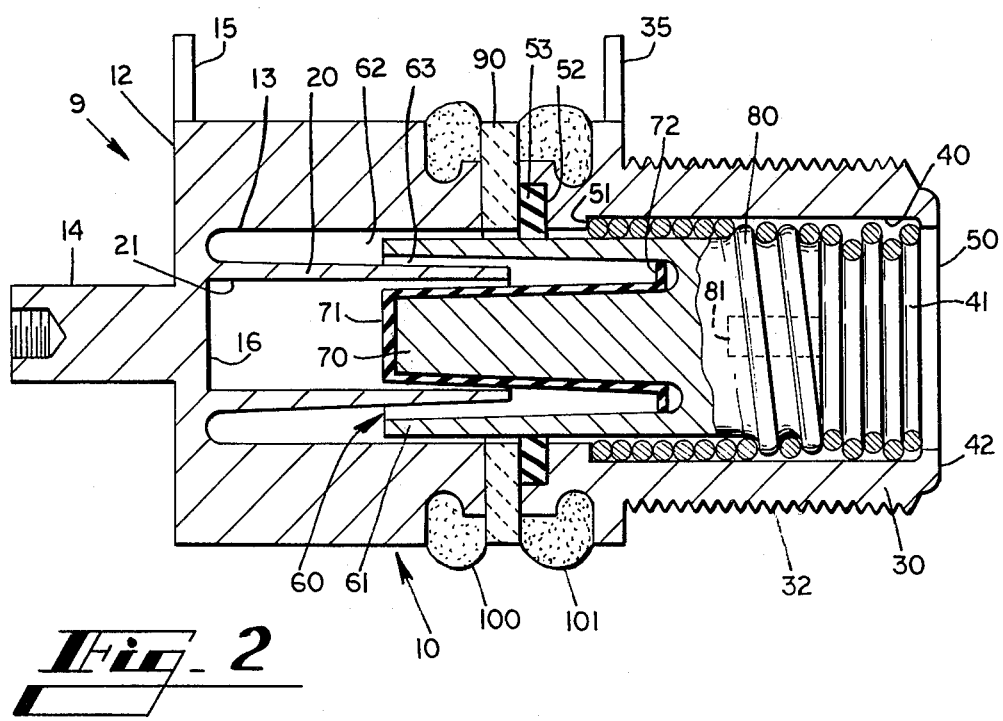
FIG. 2 is a longitudinal cross-sectional view showing the movable electrode displaced with respect to the stationary electrode.

FIG. 2 is another representation of the preferred embodiment of the present invention showing the rotor 60 displaced with respect to the stator 12. Because of the threaded engagement with spring 41, the rotor, guided by the coil spring, axially withdraws from the stator when the rotor is turned. As thus turned, annular rotor shell 61 and its rod 70 are displaced further outwardly from within stator recess 13, receptacle 21, and stator shell 20 so that the capacitance of the device is decreased because of the decreased surface area overlap between the stator and rotor.

FIG. 3 is a transverse cross-sectional view taken along line 3—3 of FIG. 1. Cylindrical stator 12 with cylindrical recess 13, cylindrical shell 20, and cylindrical receptacle 21 form the surfaces of the stationary electrode in the preferred embodiment. These surfaces are separated by air spaces 62, 63 from the surfaces of cylindrical rotor shell 61 and rod 70, which provide the movable electrode. Teflon guide sleeve 71 separates rod 70 from stator shell 20.

FIG. 4 is a transverse cross-sectional view taken along the line 4—4 of the embodiment shown in FIG. 1 and is a view of bushing 30 at the point of assembly with the annular pedestal washer. The annular recess 52 is shown containing annular rubber washer 53 within the confines of its outer diameter. The inside diameter of the rubber washer circumferentially surrounds the outer diameter of cylindrical shell 61 of the rotor. Rotor rod 70 is concentrically contained within the shell 61. Air space 63 separates the rod from the shell, and is of a diameter sufficient to receive the shell of stator (not shown) when the rotor is advanced along the spring into capacitive engagement with the stator.

FIG. 5 is a transverse cross-sectional view taken along the line 5—5 of the embodiment shown in FIG. 1. Bushing 30 is seen to have threads 32 defined along the outer surface so as to receive the threaded nut (not shown) which holds the entire assembly to a mounting surface. Rectangular slot 81 of the rotor 60 is used to turn the rotor so as to vary the capacitance of the device. The eccentricity of spring 41 may be seen with a typical turn 43 being axially offset from a neighboring turn 44.

FIG. 6 is a partial longitudinal sectional view of cylindrical rotor 60. The upper part of the rotor is cut away to show cylindrical rod 70 and cylindrical shell 61 with air space 63 defined therebetween so as to receive the sleeve of the stator (not shown). At the end of the rotor opposite the capacitive elements are the threads 80 defined upon the outer surface of the rotor which receive the coils of the coil spring, and the screwdriver slot 81 used to adjust the capacitance.

It is to be understood that while a preferred embodiment with an alternative configuration has been illustrated and described herein, other alternative configurations or modifications may occur to those skilled in the art and what is intended to be covered herein is not only the illustrated form of the invention, but also any and all modified forms thereof as may come within the scope and spirit of this invention as hereinbefore described and defined in the following claims.

I claim:

1. In a variable coaxial air trimmer capacitor including at least one stationary electrode and at least one movable electrode adapted to be moved with respect to said stationary electrode so as to vary the capacitance, dielectric means for separating said movable electrode from said stationary electrode, a housing containing said stationary electrode at one end and said movable electrode at the opposite end, the improvement comprising:
   a rotor mounted for rotation about an axis within said housing and including said movable electrode affixed at one end;
   means defining a thread upon at least a portion of the outer surface of said rotor; and
   coil multi-turn resilient spring means confined within said housing for engaging said thread as said rotor rotates about said axis.

2. The variable capacitor of claim 1 wherein said coil spring means comprises a tightly wound coil spring, each turn of said spring having a center offset from the center of each adjacent turn.

3. The variable capacitor of claim 1, wherein said housing comprises a stator which houses said stationary electrode and a bushing which houses said movable electrode and said spring, said stator being sized and shaped to receive said movable electrode, said variable capacitor further comprising an annular sealing member between said stator and said bushing and circumferentially surrounding said movable electrode, whereby said movable electrode is sealed from the external environment and whereby rotational resistance is provided to said movable electrode.

4. The variable capacitor of claim 1 wherein said coil spring means comprises a tightly wound coil spring.

5. A variable air trimmer capacitor comprising a housing including a bushing defining a cylindrical opening and a stator mounted to said bushing and defining a cavity aligned with the opening of said bushing and including an annular electrode projecting toward the cylindrical opening of said bushing, a helical conductor confined in the cylindrical opening of said bushing, said helical conductor comprising a series of coils with each of the coils axially offset with respect to adjacent ones of the coils, a rotor including an annular electrode sized and shaped to axially interfit with the annular electrode of said stator, and helical threads engaged with some of the coils of said helical conductor, whereby when the rotor is rotated with respect to the helical threads, the helical threads thread themselves through the coils of the helical conductor and some of the coils of the helical conductor surround a portion of the electrode of the rotor and the electrode of the rotor withdraws from the electrode of the stator.

6. The capacitor of claim 5 and wherein the diameter of the helical threads of said rotor and the outside diameter of the portion of the electrode of said rotor adjacent said helical threads are larger than the inside passageway through said axially offset coils of the helical conductor, whereby as the coils of the helical conductor are moved onto the helical threads and onto a portion of the electrode adjacent the helical threads the coils of the helical conductor are forced toward coaxial alignment with one another to make positive contact with the helical threads and the electrode.

7. The capacitor of claim 5 and wherein a resilient annular washer is supported by said housing and surrounds and frictionally engages the annular electrode of said rotor whereby rotation of the rotor with respect to the housing is retarded.

* * * * *